(12) United States Patent
Amit et al.

(10) Patent No.: US 9,851,928 B2
(45) Date of Patent: Dec. 26, 2017

(54) PRINTING WITH TARGET COLOR DATA

(75) Inventors: Gal Amit, Bat Yam (IL); Ran Waidman, Rehovot (IL); Tsafrir Yedid Am, Rehovot (IL)

(73) Assignee: HP INDIGO B.V., Amstelveen (NL)

( * ) Notice: Subject to any disclaimer, the term of this patent is extended or adjusted under 35 U.S.C. 154(b) by 163 days.

(21) Appl. No.: 14/391,125

(22) PCT Filed: Apr. 12, 2012

(86) PCT No.: PCT/EP2012/056674
§ 371 (c)(1),
(2), (4) Date: Feb. 4, 2015

(87) PCT Pub. No.: WO2013/152792
PCT Pub. Date: Oct. 17, 2013

(65) Prior Publication Data
US 2015/0138571 A1    May 21, 2015

(51) Int. Cl.
G06F 3/12 (2006.01)
G06K 15/02 (2006.01)
H04N 1/00 (2006.01)
H04N 1/60 (2006.01)

(52) U.S. Cl.
CPC .......... *G06F 3/1208* (2013.01); *G06F 3/1254* (2013.01); *G06F 3/1281* (2013.01); *G06F 3/1288* (2013.01); *G06K 15/027* (2013.01); *H04N 1/00087* (2013.01); *H04N 1/6052* (2013.01); *H04N 1/6055* (2013.01)

(58) Field of Classification Search
CPC .......... H04N 1/00087; H04N 1/00819; G06K 15/027
See application file for complete search history.

(56) References Cited

U.S. PATENT DOCUMENTS

| | | |
|---|---|---|
| 6,157,469 A | 12/2000 | Mestha |
| 6,757,076 B1 | 6/2004 | Mestha et al. |
| 6,995,870 B2 | 2/2006 | Holub |
| 7,069,164 B2 | 6/2006 | Viturro et al. |
| 7,728,845 B2 | 6/2010 | Holub |
| 7,990,592 B2 | 8/2011 | Mestha et al. |
| 8,014,024 B2 | 9/2011 | Viturro et al. |
| 2007/0139734 A1 | 6/2007 | Fan et al. |
| 2007/0268502 A1* | 11/2007 | McCarthy ............. G06F 3/1204 358/1.9 |
| 2008/0074686 A1 | 3/2008 | Naito et al. |
| 2008/0145125 A1* | 6/2008 | Mestha ................. G06F 3/1205 400/76 |

(Continued)

OTHER PUBLICATIONS

International Searching Authority, International Search Report and Written Opinion, PCT/EP2012/056674, 13 pages, dated Sep. 6, 2012.

*Primary Examiner* — Nicholas Pachol
(74) *Attorney, Agent, or Firm* — HP Inc. Patent Department

(57) ABSTRACT

In one embodiment, a processor-readable medium stores code representing instructions that when executed by a processor cause the processor to print a print job, and determine target color data for each sheet of the print job while printing the job. The instructions further cause the processor to continually save the target color data to a server for each sheet of the print job as each sheet is printed.

6 Claims, 5 Drawing Sheets

(56) References Cited

U.S. PATENT DOCUMENTS

| | | | |
|---|---|---|---|
| 2009/0097066 A1* | 4/2009 | Fukudome | H04N 1/00856 358/1.15 |
| 2009/0244642 A1* | 10/2009 | Dalrymple | H04N 1/6033 358/3.28 |
| 2011/0304866 A1* | 12/2011 | Sawada | G06F 3/1208 358/1.9 |
| 2012/0007905 A1* | 1/2012 | Tuttnauer | B41J 2/2128 347/14 |
| 2012/0133978 A1* | 5/2012 | Kimura | H04N 1/00411 358/1.15 |
| 2012/0269525 A1* | 10/2012 | Shindo | G06F 3/1208 399/39 |
| 2013/0038884 A1* | 2/2013 | Anderson | H04N 1/603 358/1.9 |
| 2013/0128289 A1* | 5/2013 | Sawatzki | G06K 15/02 358/1.9 |
| 2013/0250322 A1* | 9/2013 | Kawabata | H04N 1/60 358/1.9 |

* cited by examiner

PRINTING WITH TARGET COLOR DATA

CROSS-REFERENCE TO RELATED APPLICATIONS

This patent application is related to co-pending, co-assigned, International Patent Application No. PCT/US2011/026520, entitled, "Printing," filed on 28 Feb. 2011, which International Patent Application is incorporated herein in its entirety.

BACKGROUND

Color output in printing systems can be affected by print components whose conditions change during the lifetime and usage of the printing system. For example, component temperatures, sheet material properties, electrical resistances, ink properties, toner properties such as conductivities and densities, binary ink developer properties, and/or other states may change during the lifetime and usage of a printer. Most printers are calibrated on a regular basis (e.g., after having printed a certain number of sheets) to maintain better control of the color output. For example, some digital presses run a full color calibration approximately every 10,000 or 20,000 printed sheets to improve the alignment of the digital input with the color output. However, the ability to consistently reproduce colors across printing presses remains a generally unresolved aspect of digital commercial presses.

BRIEF DESCRIPTION OF THE DRAWINGS

The present embodiments will now be described, by way of example, with reference to the accompanying drawings, in which.

DETAILED DESCRIPTION

Overview

Figure 1:
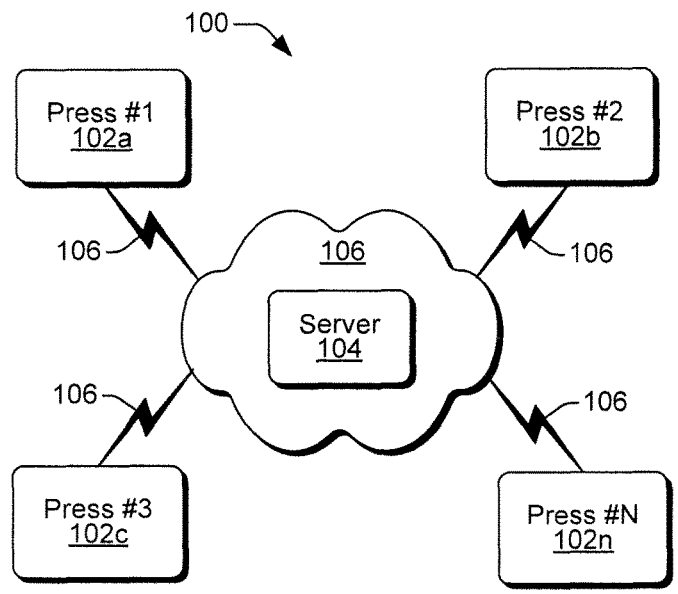
FIG. 1 shows an exemplary printing environment suitable for implementing continuous inter-press color matching as disclosed herein, according to an embodiment.

As generally noted above, the ability to consistently reproduce colors across printing presses is an important, but generally unresolved, aspect of digital commercial presses. In addition to the general importance of maintaining consistent color reproduction in digital presses, such consistency has even greater consequences when using certain customer printing modes. For example, digital presses are increasingly being used for printing photo albums, and the same print jobs are now often being printed on multiple, different presses.

When printing photo albums, the print jobs are usually short, but they demand superb color consistency between front and back pages. In addition, photo albums are commonly printed on two-engine web presses. Because photo albums often have photos that are big enough to occupy two consecutive pages within the album, it is a common occurrence to have half of a photo image printed by one print engine while the other half of the image is printed by another print engine. Therefore, in a photo album printing mode, if the two print engines do not reproduce colors with a high degree of uniformity, the color discrepancies from page to page within the album will be very apparent, and customers may reject the photo album.

Inconsistency in color reproduction between printing presses is also becoming more noticeable as more printing press customers are beginning to use multiple presses to print a single print job (i.e., the same print job printed across multiple presses). Multiple presses, located at the same printing site or at multiple printing sites, are increasingly being used to print the same print job. The use of multiple presses to print the same job provides a customer with a direct and easy comparison of the color output produced on the different presses. Therefore, printing a single job on multiple presses is another print mode that tends to make inconsistent color reproduction between presses very apparent to customers.

Currently, there are few if any solutions for providing consistent color reproduction across two or more printing presses (or print engines). One method of calibrating different presses is to perform a precise color calibration using the same calibration page between the different presses. In another method, a device correction link can be provided between the different presses. While such methods may offer a limited measure of color calibration at the start of a print job, there has not been a solution that provides consistent color reproduction across two or more printing presses that continually calibrates the presses as a job is being printed.

Embodiments of the present disclosure, however, provide continuous inter-press color matching that enables different printing presses to converge to the same color values for each page or sheet of a print job. A server database stores data for two or more relevant printing presses. Among the two or more presses, and at any given time, a particular press can be a "master" press that automatically and continuously saves target color data to a server database as it prints a job. The data includes, or is labeled with, identifiers that uniquely identify the print job being printed, each sheet or page of the print job, and the printing press that serves as the master press for the identified print job. Also, among the two or more printing presses, a "slave" press can access the server and read the master press target color data by identifying the print job. The slave press can then print the identified print job using the same target color data used by the master press. The terms "master" and "slave" as used herein with reference to different printing presses are merely intended to provide a descriptive indication, respectively, of a first press that initially prints a print job and saves target color data, and a second press that uses the saved target color data to follow the color output of the first press.

The server acts as a cloud server, containing and transferring the target color data between master and slave printing presses. This enables a slave press to match the master press target color data on a print job while printing the job at virtually the same time as the master press, or while printing the job at some later time after the master press has completed the print job. At least a minimal time delay is called for between printing on the master press and the slave press to enable the slave press to access the correct color data for each sheet of the job and to match the data with the appropriate sheet printed on the slave press.

In one example embodiment, a processor-readable medium stores code representing instructions that when executed by a processor cause the processor to print a print job and determine target color data for each sheet of the print job while printing the job. The instructions further cause the processor to continually save the target color data for each sheet to a server as each sheet is being printed.

In another example embodiment, a processor-readable medium stores code representing instructions that when executed by a processor cause the processor to initiate a print job on a slave press, and request target color data for the print job from a server. The instructions further cause the processor to receive target color data for each sheet of the print job as the target color data for each sheet is saved to the server from a master press. The instructions then cause the processor to control the slave press so that it prints each sheet of the print job according to the target color data.

In another example embodiment, a processor-readable medium stores code representing instructions that when executed by a processor cause the processor to receive from a first printing press, target color data for each sheet of a print job as each sheet is printed on the first press. The instructions further cause the processor to identify and save the target color data in a memory of a server according to a first press identifier, a print job identifier, and individual sheet identifiers that identify each sheet. The instructions further cause the processor to receive a request for the target color data from a second press as sheets are printed on the first press. The request includes the print job identifier to identify the print job. The instructions then cause the processor to, in response to the request, send target color data for each sheet of the print job to the second press on a sheet-by-sheet basis as the target color data for each sheet is received from the first press and saved in the memory of the server.

In another example embodiment, a printing system includes a processor and target color data stored in a memory. The target color data include solids and gray level target data for each sheet of a print job being printed on the printing system. The system further includes a continuous inter-press color match module stored in the memory and executable on the processor to continually upload the target color data on a sheet-by-sheet basis to a server as the target color data is being determined by the processor.

Illustrative Embodiments

FIG. 1 shows an exemplary printing environment 100 suitable for implementing continuous inter-press color matching as disclosed herein, according to an embodiment of the disclosure. Printing environment 100 includes two or more printing systems 102 (e.g., printing presses 102a-102n) coupled to one another through a server 104 via a network 106. Network 106 is intended to represent any of a variety of conventional network topologies and types (including optical, wired and/or wireless networks), employing any of a variety of conventional network protocols (including public and/or proprietary protocols). Network 106 may include, for example, a corporate network, a home network, or the Internet, as well as one or more local area networks (LANs) and/or wide area networks (WANs), and combinations thereof.

Figure 2:
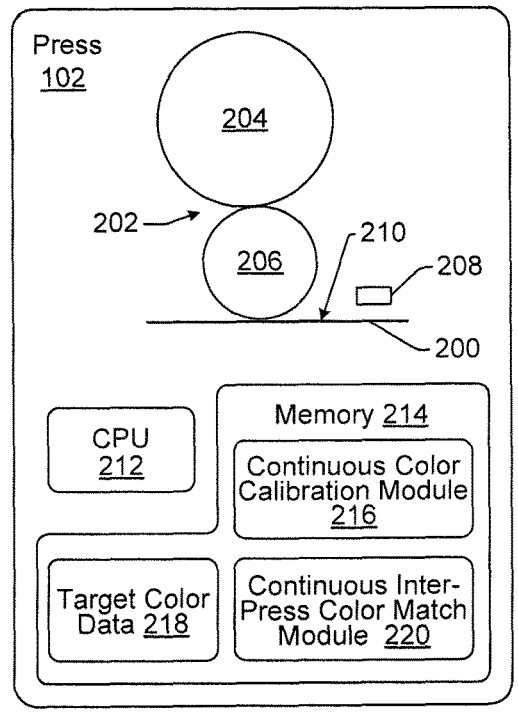
FIG. 2 shows an exemplary printing system implemented as a printing press, according to an embodiment.

A printing system 102 may be any type of printer or press, such as any type of offset printer or press. In the embodiment shown in FIG. 1, printing systems 102 each comprise a digital press 102, such as a liquid or dry electrophotographic digital press 102. FIG. 2 shows an exemplary printing system 102 implemented as a printing press 102, according to an embodiment of the disclosure. Each press 102 is generally configured to print a variety of characters, symbols, graphics, images and the like, onto media sheets 200. Sheets 200 can comprise a variety of suitable media types such as paper, card stock, transparencies, Mylar, and the like.

Press 102 includes an image transfer arrangement 202. In some implementations, the image transfer arrangement 202 includes a developer drum 204 and an image transfer drum 206 for imprinting liquid toner onto media sheets 200. In other implementations, the image transfer arrangement 202 comprises dry toner drums, offset printing drums or a print head. Press 102 also includes an image sensor 208, arranged to measure color outputs 210 printed on media sheets 200.

Press 102 includes one or more processors 212 and processor/computer-readable memory components 214 (e.g., volatile and non-volatile memory components) that store processor/computer-executable instructions in the form of various firmware, software, applications, modules, and so on. Memory 214 also stores various types of data and data structures, such as documents and/or files to be printed onto sheets 200. Such data can form print jobs that include print job commands and/or command parameters, for example. In general, processor 212 executes instructions from memory 214 to control components of press 102 such as the image transfer arrangement 202 and image sensor 208 during normal operation of the press 102.

In one implementation, memory 214 includes a continuous color calibration (CCC) module 216. The CCC module 216 includes instructions that when executed on processor 212, cause the processor 212 to perform a CCC algorithm 216 that keeps color consistency of both solids and gray levels. The CCC algorithm 216 enables a press 102 to consistently print the same colors throughout a long print job, by measuring target color data values 218 for each sheet of the print job at the beginning of the printing, and by adjusting developer voltages and grays look-up-tables (LUTs) accordingly in consecutive spreads in order to overcome color variations from sheet to sheet. The CCC algorithm is discussed in detail in the co-pending, co-assigned, International Patent Application No. PCT/US2011/026520, entitled, "Printing," filed on 28 Feb. 2011, which is incorporated herein in its entirety.

In one embodiment, the CCC algorithm 216 includes printing first color outputs on media sheets 200 using pre-calibrated color values obtained during a regular full color calibration. The first color outputs are then measured with the image sensor 208, and target color data values 218 are then determined, or based upon the first color outputs. The target color data values 218 are stored in a memory 214, and they may comprise a target LUT that couples a number of digital inputs to the corresponding first color outputs. Current color outputs are then printed on sheets 200 and measured. In time, due to changes in certain print component states (e.g., temperatures, toner conductivity, toner density, substrate color or material, certain material properties, ink properties, toner properties, binary ink developer properties), current color values being printed may differ from the target color values 218. Color compensation values are then calculated to compensate for a difference between the target color values 218 and the current color values. As printing continues, the color compensation values are used to couple more correct digital input with desired color output to better achieve the target color values 218.

Referring again to FIG. 2, in one implementation, memory 214 additionally includes a continuous inter-press color match (CIPCM) module 220. The CICPM module 220 includes instructions that when executed on processor 212, cause the processor 212 to perform a CICPM algorithm 216 that enables continuous color matching of both solids and gray levels between two or more printing presses 102.

In one implementation, the CICPM algorithm 220 operates to cause a press 102 to act as a "master" press with respect to a particular print job currently being printed. For example, while press #1, 102a (FIG. 1), prints a print job #1, press #1 operates as a master press with respect to print job #1. While the press 102 is printing the print job, the CICPM algorithm 220 operates to continuously upload target color data values 218 (i.e., the solids and gray levels) to a server 104. Target color data values 218 are determined by the CCC algorithm 216 for each sheet of a print job as the press 102 prints the job. The CICPM algorithm 220 causes processor 212 to upload the target color data values 218 to the server 104, on a sheet-by-sheet basis, as each sheet is being printed. In one implementation, while saving the target color data 218 to the server 104, the CICPM algorithm 220 also causes the processor 212 to provide identification information to the server 104. The identification information can include a job identifier that identifies the particular job being printed (e.g., job #1), a press identifier that identifies the particular press that is printing the job (e.g., press #1), and a sheet identifier that identifies the particular sheet (e.g., sheet #1) within the job with which particular target color data is associated. As discussed below, in another implementation, the CICPM algorithm 220 operates to cause a press 102 to act as a "slave" press with respect to a particular print job.

Figure 3:
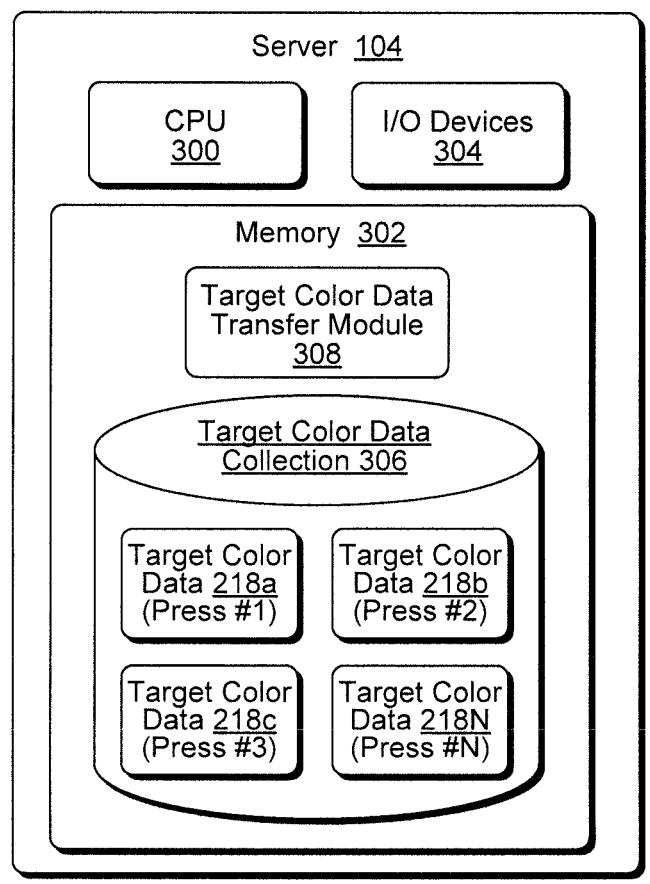
FIG. 3 shows an exemplary server, according to an embodiment.

FIG. 3, shows an exemplary server 104, according to an embodiment of the disclosure. Server 104 is intended to represent any of a variety of web servers capable of manipulating data and other content and delivering it over a network 106, such as the Internet, to devices such as printing presses 102, or other computing devices. Server 104 can be a remote server accessible over a remote network connection, or a local server accessible over a local network connection. Server 104 may be implemented as any of a variety of conventional computing devices configurable to communicate with presses 102, including, for example, a workstation, a desktop PC, a tablet PC or other portable computer, a wireless communications device, combinations thereof, and so on. Server 104 generally includes a processor (CPU) 300, a memory 302 (e.g., volatile and non-volatile memory components). Memory 302 comprises processor/computer-readable media that provides for the storage of processor/computer-executable instructions in the form of various firmware, software, applications, modules, and so on. Memory 302 also stores various types of data and data structures, such as target color data 218 from one or more presses 102. In one implementation, such target color data 218 is stored in a target color data collection 306. A target color data collection 306 can include target color data 218 from a number of different printing presses 102. Server 104 also typically includes various input/output devices 318 such as a keyboard, a mouse, and a monitor.

Server 104 may implement various application programs and/or other instructions stored in memory 302 that are executable on processor 300 to enable transactions with a number of presses 102 via a network 106, through the input, manipulation, and/or other preparation of data in electronic form (e.g., through data transfer, text entry, mouse clicks, etc.). In one implementation, for example, processor 300 on server 104 executes instructions from a target color data transfer module 308 to receive, organize, save, and transmit target color data between printing presses 102.

In one example, as a first or "master" press 102a (e.g., press #1, 102a) prints a print job, the press #1, 102a, continually uploads target color data 218a to the server 104. The target color data 218a for each sheet of the job is uploaded as each sheet of the job is being printed on the first/master press #1. Accordingly, instructions in data transfer module 308 execute on a processor 300 to receive target color data for each sheet of the print job as each sheet is printed by the first/master press #1, 102a. The transfer module 308 further executes to identify and save the target color data 218a in memory 302 of server 104 according to identification information received from the first/master press #1, 102a. The identification information can include a job identifier that identifies the particular job being printed (e.g., job #1), a press identifier that identifies the particular press printing the job (e.g., press #1), and a sheet identifier that identifies the particular sheet (e.g., sheet #1) within the job with which particular target color data 218a is associated.

When saving the target color data 218a to memory 302, in one implementation the data transfer module 308 executes on a processor 300 to organize the target color data 218a within a target color data collection 306. For example, target color data 218a can be organized into a target color data collection 306 as shown below in Table 1. Tables 1-4 show one example organization of target color data 218a-218N from numerous presses #1-#N (e.g., presses 102a-102N), as it might appear within a target color data collection 306 on server 104. It is noted that the organization of data shown in Tables 1-4 is purely for illustrative purposes, and that the actual organization of target color data on server 104 would likely take on a different format. In addition, the data values shown below in Tables 1-4 are arbitrary, and they are not intended to provide any indication as to the actual Solids and Gray levels data values that may be present in a target color data collection 306 on server 104.

TABLE 1

| | Target Color Data 218a Press #1 | | |
|---|---|---|---|
| Job #1 | Sheet 1 | Sheet 2 | Sheet N |
| Solids | 15 | 35 | 75 |
| Grays | 50 | 75 | 80 |

TABLE 2

| | Target Color Data 218b Press #2 | | |
|---|---|---|---|
| Job #2 | Sheet 1 | Sheet 2 | Sheet N |
| Solids | 25 | 35 | 50 |
| Grays | 80 | 60 | 65 |

TABLE 3

| | Target Color Data 218c Press #3 | | |
|---|---|---|---|
| Job #3 | Sheet 1 | Sheet 2 | Sheet N |
| Solids | 65 | 40 | 90 |
| Grays | 75 | 75 | 70 |

TABLE 4

| | Target Color Data 218n Press #N | | |
|---|---|---|---|
| Job #N | Sheet 1 | Sheet 2 | Sheet N |
| Solids | 85 | 15 | 55 |
| Grays | 90 | 85 | 25 |

Referring again to server 104 of FIG. 3, as a print job (e.g., job #1) is being printed on a first/master press 102*a* (e.g., press #1), and the target color data transfer module 308 executes on a processor 300 to receive and save target color data 218*a* for each sheet of the job #1 into the server memory 302, in one implementation, the transfer module 308 further executes to receive a request from a second or "slave" press 102*b* (e.g., press #2). The request from a second/slave press #2, 102*b*, includes identification information that at least identifies a print job for which the second/slave press #2 is requesting to receive target color data 218. For example, the request from the second/slave press #2 may include job identification information identifying job #1. The request may also include additional identification information that identifies the press that printed or is printing job #1, as well as specific sheet identification information that identifies a particular sheet number. In response to the request from the second/slave press #2, 102*b*, the data transfer module 308 executes to send the identified target color data 218*a* for each sheet of the print job #1 to the second/slave press #2 on a continual basis. The data is sent to the second/slave press #2 on a sheet-by-sheet basis as the target color data for each sheet is received from the first/master press #1 and saved in the memory 302 of server 104.

Thus, the server 104 receives, organizes, saves and transfers target color data 218 between "master" and "slave" printing presses, enabling a slave press to match the master press target color data on a given print job. Because a master press continually saves target color data to server 104 on a sheet-by-sheet basis, a slave press can print the same job as the master press at almost the same time, with there being only a slight time delay between printing on the master and slave presses. A minimal time delay between printing on the master press and the slave press enables the slave press to access the correct color data for each sheet of the job and to match the data with the appropriate sheet being printed on the slave press. In another implementation, a slave press can access target color data from server 104 after the master press has already completed printing the print job and saved all of the target color data to the server. Thus, the target color data 218 remains on the server 104 and is accessible at any future time by any printing press 102, including the master press that initially saved the target color data to the server 104.

Referring again to FIG. 2, as noted above, in one implementation the CICPM algorithm 220 executes on a press 102 to cause a press 102 to act as a "slave" press with respect to a particular print job. For example, while press #1, 102*a* (FIG. 1), prints a print job #1, press #1 operates as a master press with respect to print job #1 and saves target color data 218*a* to server 104. At the same time, or at some time in the future, press #2, 102*b* (FIG. 1), can be printing the same print job #1. In this case, the CICPM algorithm 220 executes on press #2 to make a request to the server 104 to retrieve the target color data 218*a* so that it can use the target color data 218*a* to match its own color outputs with those of press #1 when press #1 printed the print job #1. In this respect, the CICPM algorithm 220 causes press #2, 102*b*, to act as a "slave" press, following the color outputs of the "master" press.

In one implementation, the same press can act as both the master press and the slave press. For example, press #1 can initially operate as a master press with respect to print job #1, as it saves target color data 218*a* to server 104. At some time in the future, if print job #1 is to be printed again on press #1, press #1 can then operate as a slave press with respect to print job #1. In this case, press #1 sends a request to the server 104 to retrieve the previously saved target color data 218*a* in order to follow the same color outputs that it initially achieved when it printed print job #1 the first time.

In general, when a press 102 acts as a slave press, the CICPM algorithm 220 executes on the press 102 to make a request to the server 104 to retrieve target color data 218 for a particular print job. The request includes identification information that at least identifies a print job for which the slave press 102 is requesting to receive target color data 218. For example, the request from a slave press 102 may include job identification information identifying a print job #1. The request may also include additional identification information that identifies the press that printed, or is printing job #1, as well as specific sheet identification information that identifies a particular sheet number. The slave press 102 can receive target color data for each sheet of the print job #1 as while, or shortly after, the target color data for each sheet is being saved to the server 104 from a master press. In one implementation, where the target color data for all sheets of the print job #1 have already been previously saved to the server 104 by the master press, the target color data for the entire print job is received by the slave press. Upon receiving the target color data 218, the processor controls the slave press to print each sheet of the print job according to the target color data.

In different implementations, the CICPM algorithm 220 can execute on a slave press 102 in an absolute target color mode and a relative target color mode. As noted above, each press 102 executes a CCC algorithm 216 that determines target color data for a print job. However, in the absolute target color mode, when the slave press receives master target color data 218 from server 104, it overrides its own target color data with the master target color data to print the job. In the relative target color mode, the slave press receives master target color data from the server 104 that comprises target color deltas from its own target color data. In this mode, the slave press does not override its own target color data, but instead it calculates corrections using the deltas received from the server 104.

Figure 4:
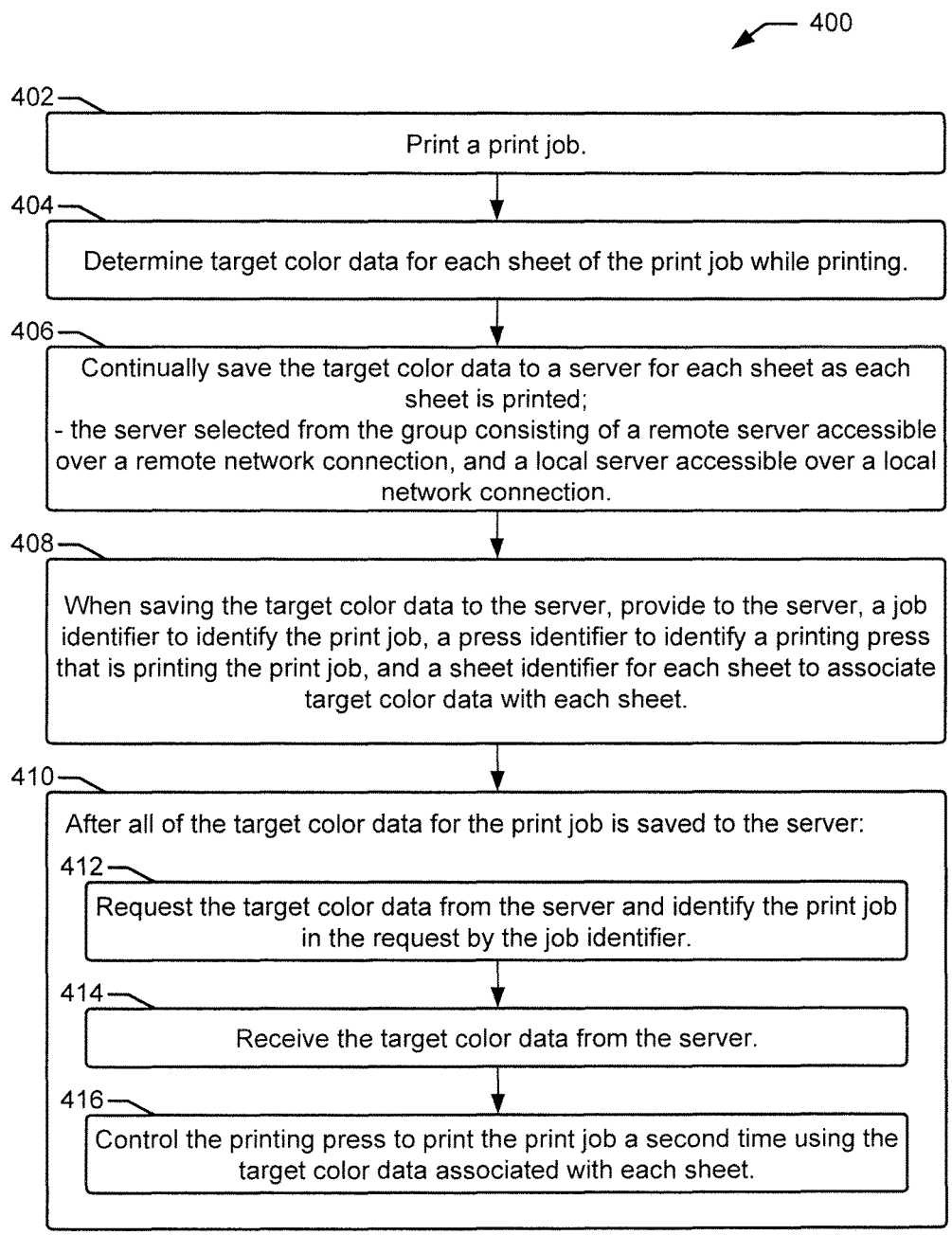
FIGS. 4, 5 and 6, show flowcharts of example methods related to printing with target color data, according to embodiments.
Figure 5:
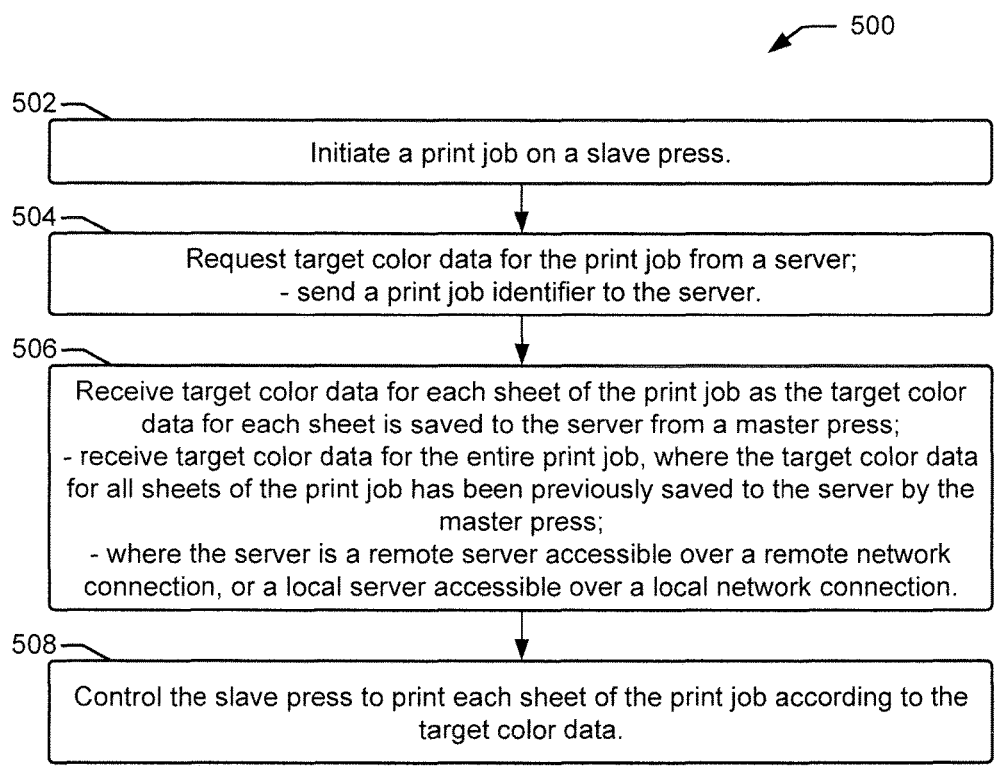
Figure 6:
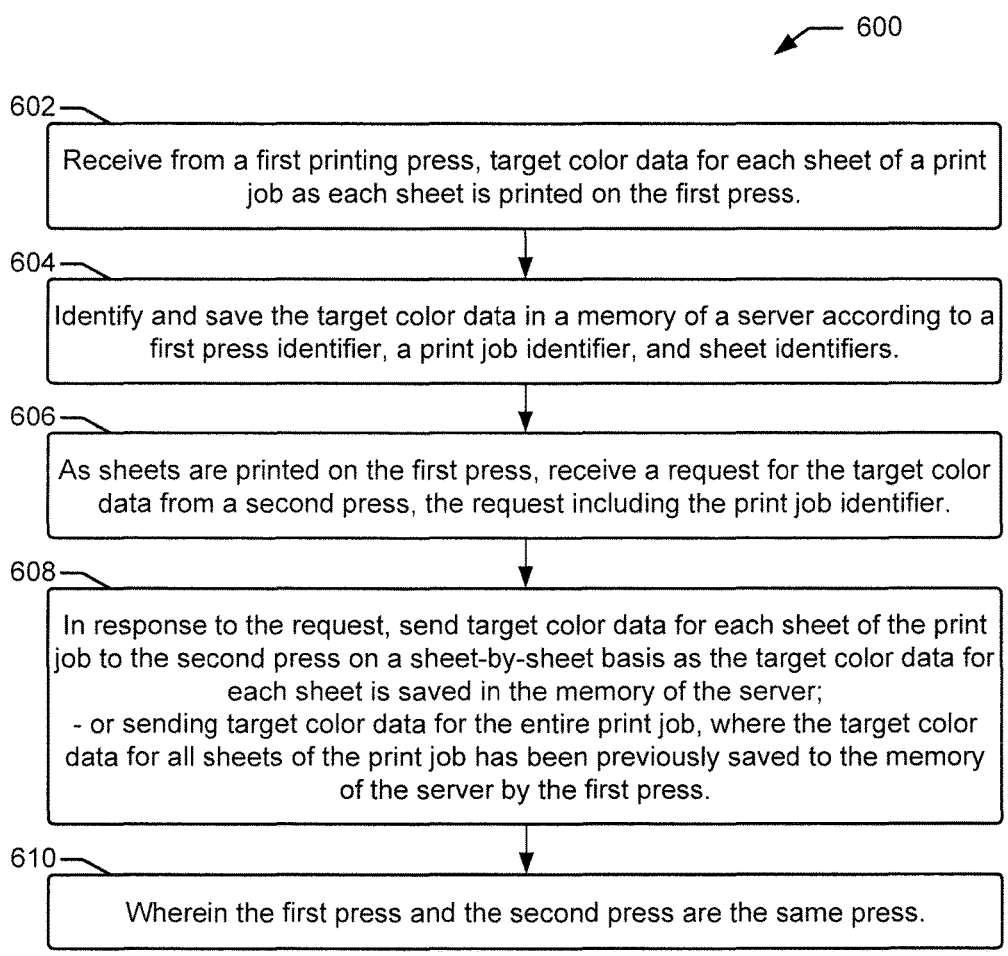

FIGS. 4, 5 and 6, show flowcharts of example methods 400, 500 and 600, related to printing with target color data, according to embodiments of the disclosure. Methods 400, 500 and 600 are associated with the embodiments discussed above with regard to FIGS. 1-3, and details of the steps shown in methods 400, 500 and 600, can be found in the related discussion of such embodiments. The steps of methods 400, 500 and 600, may be embodied as programming instructions stored on a computer/processor-readable medium, such as memory 214 and 302 of FIGS. 2 and 3. In an embodiment, the implementation of the steps of methods 400, 500 and 600, is achieved by the reading and execution of such programming instructions by a processor, such as processor 212 and 300 of FIGS. 2 and 3. Methods 400, 500 and 600, may include more than one implementation, and different implementations of methods 400, 500 and 600, may not employ every step presented in the respective flowcharts. Therefore, while steps of methods 400, 500 and 600, are presented in a particular order within their respective flowcharts, the order of their presentation is not intended to be a limitation as to the order in which the steps may actually be implemented, or as to whether all of the steps may be implemented. For example, one implementation of method 400 might be achieved through the performance of a number of initial steps, without performing one or more subsequent steps, while another implementation of method 400 might be achieved through the performance of all of the steps.

Method 400 of FIG. 4, begins at block 402, where the first step shown is to print a print job. At block 404, the method 400 continues with determining target color data for each sheet of the print job while the job is printing. In one embodiment, as discussed above, target color data is determined by a CCC algorithm that executes to print first color outputs on media sheets using pre-calibrated color values obtained during a regular full color calibration. The first color outputs are then measured with an image sensor 208, and target color data values 218 are then determined, or based upon the first color outputs.

The method 400 continues at block 406 with continually saving the target color data to a server for each sheet as each sheet of the job is printed. The server can be a remote server accessible over a remote network connection, a local server accessible over a local network connection, or a server in another configuration. At block 408 of method 400, identification information is provided to the server when the target color data is being saved to the server. The identification information can include a job identifier to identify the print job, a press identifier to identify a printing press that is printing the print job, and a sheet identifier for each sheet to associate target color data with each sheet.

As shown at block 410, after all of the target color data for the print job is saved to the server, the method 400 continues at block 412 with requesting the target color data back from the server and identifying the print job in the request by the job identifier. In this implementation, the same press that previously acted as a master press to save the target color data to the server, is now acting as a slave press to retrieve the target color data back from the server, as shown at block 414. At block 416, the printing press is controlled to print the print job a second time using the target color data associated with each sheet.

Method 500 of FIG. 5, begins at block 502, where the first step shown is to initiate a print job on a slave press. At block 504, target color data for the print job is requested from a server. The request includes sending a print job identifier to the server. At block 506, method 500 continues with receiving target color data for each sheet of the print job as the target color data for each sheet is being saved to the server from a master press. The receiving can also include, in an embodiment, receiving target color data for the entire print job, where the target color data for all sheets of the print job has been previously saved to the server by the master press. The server can be a remote server accessible over a remote network connection, or a local server accessible over a local network connection. At block 508 of method 500, the slave press is then controlled in order to print each sheet of the print job according to the target color data.

Method 600 of FIG. 6, begins at block 602, where the first step shown is to receive from a first printing press, target color data for each sheet of a print job as each sheet is being printed on the first press. At block 604, the target color data is identified and saved in a memory of a server according to a first press identifier, a print job identifier, and sheet identifiers. At block 606 of method 600, as sheets are printed on the first press, a request for the target color data is received from a second press. The request from the second press includes the print job identifier. At block 608 of method 600, in response to the request, target color data for each sheet of the print job is sent to the second press on a sheet-by-sheet basis as the target color data for each sheet is saved in the memory of the server. In one implementation, the target color data for the entire print job is sent, where the target color data for all sheets of the print job has been previously saved to the memory of the server by the first press. As shown at block 610 of method 600, the first press and the second press can be the same press.

What is claimed is:

1. A non-transitory processor-readable medium storing code representing instructions that when executed by a processor cause the processor to:
   determine, by a first printer printing a print job, target color data for each sheet of the print job while printing; and
   continually save, by the first printer, the target color data to a server for each sheet as each sheet is printed, wherein each sheet is a sheet in a plurality of sheets, wherein the continually saved target color data is retrieved by a second printer to print a portion of the print job simultaneously with the printing by the first printer.

2. A non-transitory processor-readable medium as in claim 1, wherein the instructions further cause the processor to:
   when saving the target color data to the server, provide to the server, a job identifier to identify the print job, an identifier to identify the first printer that is printing the print job, and a sheet identifier for each sheet to associate target color data with each sheet.

3. A non-transitory processor-readable medium as in claim 1, wherein the instructions further cause the processor to:
   after all of the target color data for the print job is saved, request the target color data from the server and identify the print job in the request by the job identifier;
   receive the target color data from the server; and
   control the first printer to print the print job a second time using the target color data associated with each sheet, or control a second printer to print the print job a second time using the target color data associated with each sheet.

4. A non-transitory processor-readable medium as in claim 1, wherein continually saving the target color data to a server comprises saving the target color data to a server selected from the group consisting of a remote server accessible over a remote network connection, and a local server accessible over a local network connection.

5. A non-transitory processor-readable medium as in claim 1, wherein determining target color data for each sheet of the print job while printing comprises:
   determining pre-calibrated color values in a full color calibration;
   printing first color outputs on media sheets using the pre-calibrated color values; and
   measuring the first color outputs with an image sensor and determining the target color data based on the measured first color outputs.

6. A non-transitory processor-readable medium as in claim 1, wherein each sheet in the plurality of sheets includes at least a slight color variation.

* * * * *